(12) United States Patent
Chien et al.

(10) Patent No.: US 7,198,504 B2
(45) Date of Patent: Apr. 3, 2007

(54) VERTICAL TYPE AUDIO JACK CONNECTOR

(75) Inventors: Min-Ling Chien, Taipei (TW); Kai-Ray Cheng, Taipei (TW); Jian Cheng, Taipei (TW)

(73) Assignee: Advanced Connectek Inc., Taipei Hsien (TW)

( * ) Notice: Subject to any disclaimer, the term of this patent is extended or adjusted under 35 U.S.C. 154(b) by 0 days.

(21) Appl. No.: 11/411,790

(22) Filed: Apr. 27, 2006

(65) Prior Publication Data

US 2007/0049102 A1 Mar. 1, 2007

(30) Foreign Application Priority Data

Aug. 26, 2005 (TW) ............................. 94214711 U

(51) Int. Cl.
H01R 4/38 (2006.01)

(52) U.S. Cl. .................................................... 439/385

(58) Field of Classification Search ................ 439/385, 439/668, 669, 577
See application file for complete search history.

(56) References Cited

U.S. PATENT DOCUMENTS 6,368,156 B1 * 4/2002 Lin ............................. 439/668
6,595,804 B2 * 7/2003 Nagata ........................ 439/668
6,908,343 B1 * 6/2005 Hu .............................. 439/668
6,971,907 B1 * 12/2005 Stroud ......................... 439/490
7,044,804 B2 * 5/2006 Han et al. .................... 439/668

* cited by examiner

Primary Examiner—Phuong Dinh
(74) Attorney, Agent, or Firm—Troxell Law Office, PLLC

(57) ABSTRACT

A vertical type audio jack connector comprises an insulative housing, a plurality of terminals, an LED and a shielding case. The insulative housing has a rectangular portion and a mating portion, the mating portion has an insertion hole, on the left, right and top of the circular surface of the mating portion each has a notch which communicates with the insertion hole respectively; the rectangular portion has a plurality of grooves and slide slots for disposing the terminals, in the interior of the insulative housing having a first, a second and a third chamber which is communicated with the insertion hole respectively, the first chamber and the third chamber are separated by a partition board which has a tapered opening; the LED is disposed firmly within the third chamber. When the optical fiber plug is plugged in, the forehead of the optical fiber plug contacts with the LED through the tapered opening of the partition board to achieve signal connection, and when the audio plug is plugged in, it achieves signal connection through terminal conduction.

1 Claim, 4 Drawing Sheets

VERTICAL TYPE AUDIO JACK CONNECTOR

BACKGROUND OF THE INVENTION

1. Field of the Invention

The present invention relates to a vertical type audio jack connector, especially to an audio jack connector which could provide for different mating plugs to achieve needed signal transmission.

2. Description of Related Art

Audio connectors having sound effect are universally used in audio-visual products, their main function is to provide signal transmission among electronic systems, the basic structures thereof have been disclosed in earlier patents.

In recent years, with continuous innovation of technologies, various portable electronic products are presented to the public frequently, the application of audio connectors in these products also become very important. Now with the constant development of optical fiber communication technology, the requirements to optical fiber connectors are increasing unceasingly, the common optical fiber connectors are also mainly used in audio and visual interfaces, now they are widely used in every industries for the optical fiber transmission has advantageous of the high-speed transmission, low attenuation and less signal cross talk. The audio connector used at the present time is a horizontal type single jack connector which could only mate with a single plug and could not achieve multiple function combination, if the audio jack and the optical fiber jack are stacked directly, it would increase the volume of the corresponding electronic product, which is adverse to the developing tendency requirement of light weight and small size of the electronic product. On account of the above adverse factors, it is necessary to improve the conventional audio jack connector.

SUMMARY OF THE INVENTION

The main object of the present invention is to provide a vertical type audio jack connector, especially an audio jack connector with multiple purposes which could match with different types of mating plugs to achieve multiple function signal transmission.

Another object of the present invention is to provide a vertical type audio jack connector with which the vertical type shielding case structure provides a complete shielding effect.

To achieve the above objects, the audio jack connector comprises an insulative housing, a plurality of terminals, an LED (Light Emitting Diode) and a shielding case, wherein the insulative housing is composed of an upper seat body and lower cover body, the upper seat body has a rectangular portion and a circular mating portion extended from a side of the rectangular portion, the mating portion extends inward an insertion hole which passes through the interior channel of the rectangular portion, on a left and right two sides and top of a circular surface of the mating portion each has a notch communicated with the insertion hole; the rectangular portion has a plurality of grooves and interior chambers, the interior chambers is composed of a first chamber, a second chamber and a third chamber which are communicated with an interior channel of the rectangular portion, the first chamber and the third chamber are separated by a partition board having a tapered opening. The LED is disposed in the third chamber, the conductive portion of the LED is exposed out to be soldered onto the PCB. The plurality of terminals are inserted into the corresponding grooves and slide slots from a rear side of the upper seat body and the lower cover body, the upper seat body and the lower cover body are formed as an integral through securing the locating poles and the locating holes together. When the audio plug is plugged into the first chamber through the insertion hole of the insulative housing, the audio plug is contacted closely with each terminal to achieve signal transmission. When the optical fiber plug is plugged in from the insertion hole of the insulative housing, the optical fiber plug passes through the first chamber and the opening to contact with the LED disposed in the third chamber, to achieve high frequency signal transmission through the optical fiber. Therefore, the audio jack connector has multifold using functions.

Contrast with the conventional technology, the audio jack connector of the present invention has following advantages: (1). The audio jack connector could provide at least two different types of plug connectors for signal connection, to achieve multi function composing effects of electrical connectors; (2). The audio jack connector has a complete shielding case, which could prevent the exterior electromagnetic interference.

The above and other objects, features and advantages of the present invention will become apparent from the following detailed description taken with the accompanying drawings.

DETAILED DESCRIPTION OF THE PREFERRED EMBODIMENTS

Figure 1:
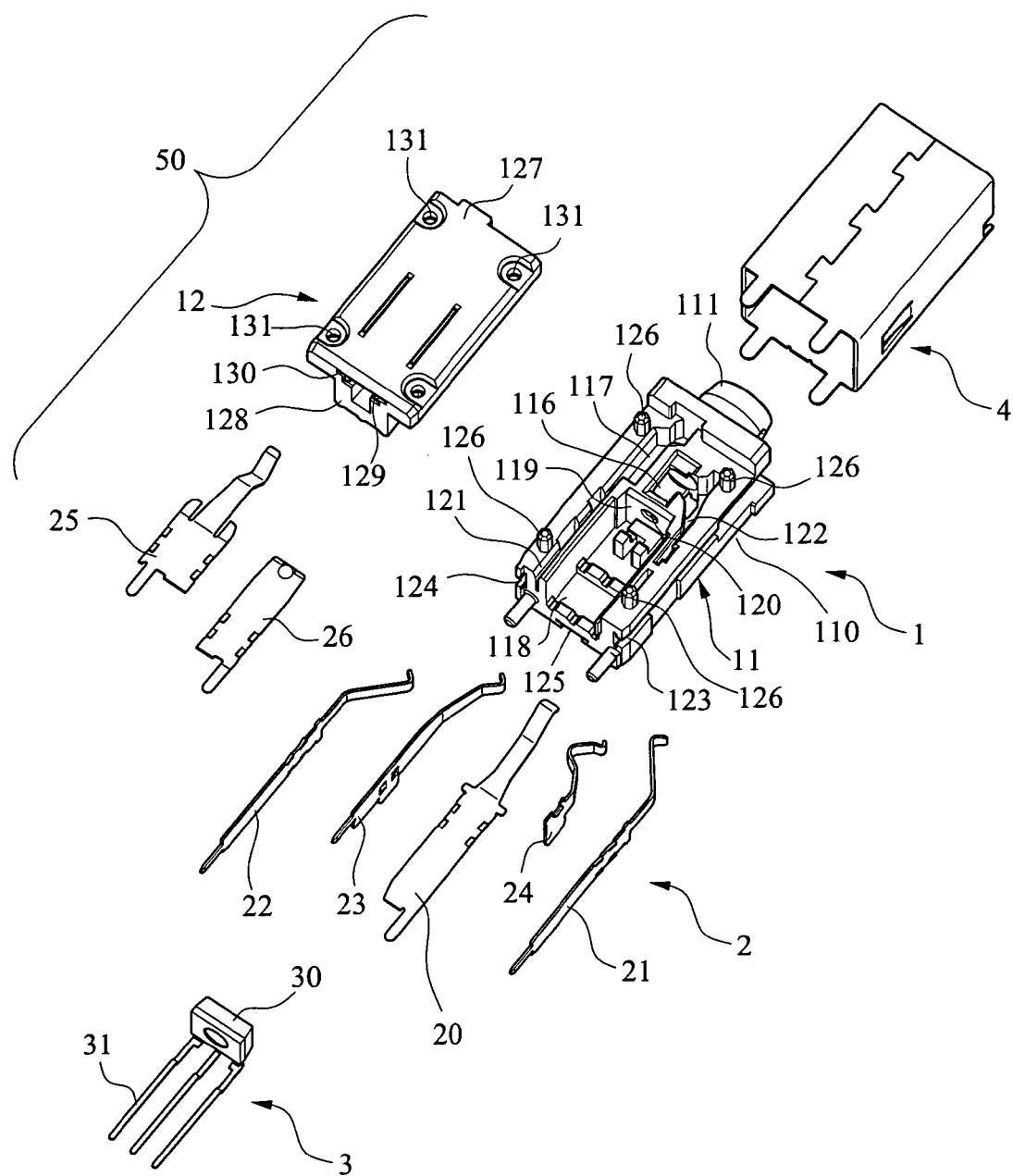
FIG. 1 is an exploded perspective view of a preferred embodiment of the present invention.
Figure 2:
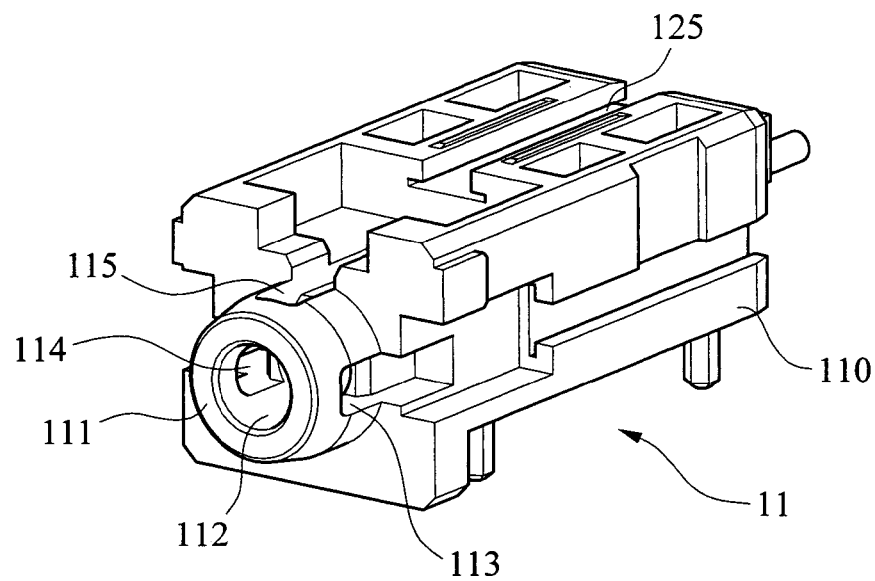
FIG. 2 is a perspective view of the preferred embodiment of the present invention without shielding case from another angle.
Figure 7:
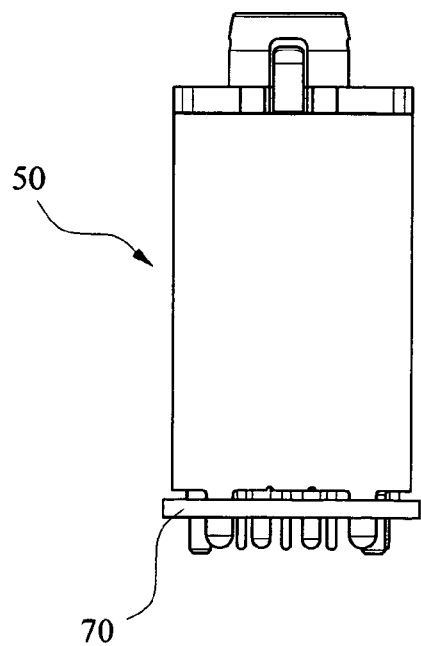
FIG. 7 is a plan view when the audio jack connector of the present invention mounted onto the PCB.

Please refer to FIGS. 1 and 7, the audio jack connector 50 of the present invention is designed in vertical type, comprising an insulative housing 1, a plurality of terminal 2, an LED 3 and a shielding case 4. Now referring to FIGS. 1 and 2, a detailed description is illustrated the structure of the present invention hereafter.

The insulative housing 1 comprises an upper seat body 11 and lower cover body 12. The upper seat body 11 has a rectangular portion 110 and a circular mating portion 111 extended from a side of the rectangular portion 110, the mating portion 111 extends inward an insertion hole 112 for inserting an audio plug 5 or an optical fiber plug 6, the insertion hole 112 passes through the interior channel of the rectangular portion 110, on the symmetrical left and right two sides and top of the circular surface of the mating portion 111 has a plurality of notches 113, 114 and 115 each communicates with the insertion hole 112 for accommodating the contact portion of the terminals 20, 21, 22 and 23; in the interior of the rectangular portion 110 having a first chamber 116, a second chamber 117 and a third chamber 118 which are communicated with the interior channel of the rectangular portion 110, the back side of the third chamber 118 is an open space for disposing the LED 3 therein, the first chamber 116 and the third chamber 118 are separated by a partition board 119 which has a tapered opening 120 for inserting the plug. The upper seat body 11 has a plurality of grooves 121, 122, 123, 124 and 125 for accommodating the plurality of terminals 2, whereinto, the groove 121 is provided for disposing the terminal 23 and communicated with the second chamber 117, the groove 122 is provided for disposing the terminal 24 and communicated with the first chamber 116, the two side grooves 123 and 124 are provided for disposing the terminals 21 and 22 respectively and connected with the notches 113 and 114 respectively, the groove 125 is provided for disposing the terminal 20 and connected with the notch 115, in all the grooves after the terminals are disposed, the connecting portions of the of terminals 2 could communicate with the insertion hole 112 to secure the terminals 2 and the audio plug 5 to achieve signal transmission, on two sides of the bottom of the upper seat body 11 along the longitudinal direction having a plurality of locating poles 126 for fastening the lower cover body 12. The lower cover body 12 comprises a base portion 127 and a convex rib 128, on the rear side of the base portion 127 extending inward two slide slots 129 and 130 for disposing the terminals 25 and 26 respectively, the convex rib 128 could be clasped in the third chamber 118 and abut against the conducting portion 31 of the LED 3 to hold the LED 3 in place, on two sides of the base portion 127 along the longitudinal direction has a plurality of locating holes 131 for matching with the locating poles 126, to secure the upper seat body 11 and the lower cover body 12 together.

Figure 5:
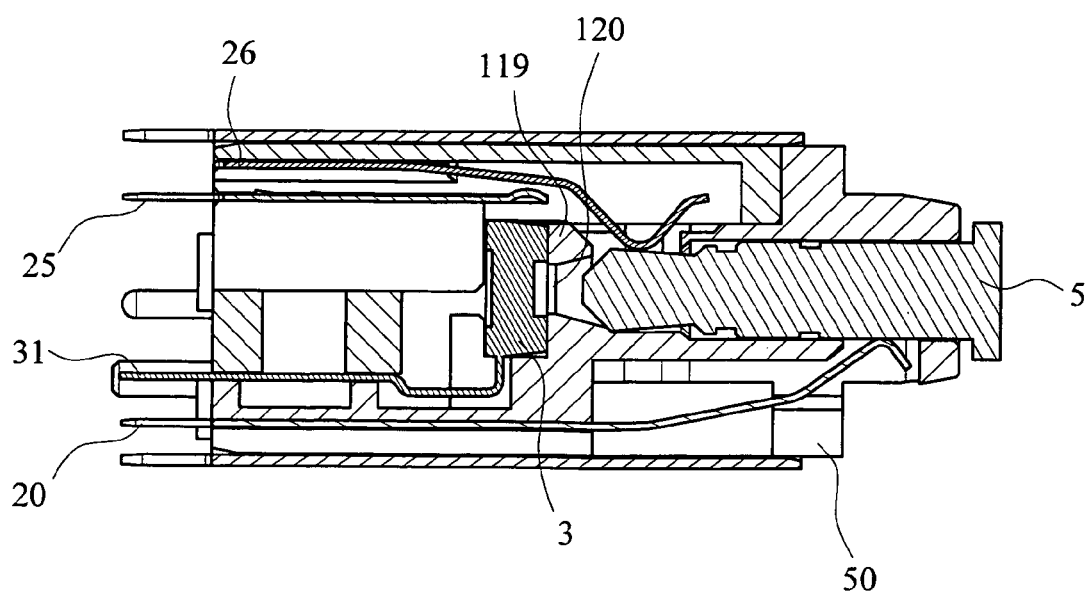
FIG. 5 is a section view when an audio plug is inserted into the audio jack connector of the present invention.

The plurality of terminals 2 are composed of conductive terminals and a nonconductive terminal, except for the terminal 24 is a nonconductive terminal, the other terminals are all conductive terminals, all terminals are designed in bar-shaped structure, and the terminal 25 and the terminal 26 form a set of switch terminals, the terminal 26 departs from the terminal 25 elastically when the plug 5 is inserted into the inserting hole 112, as shown in FIG. 5.

Figure 3:
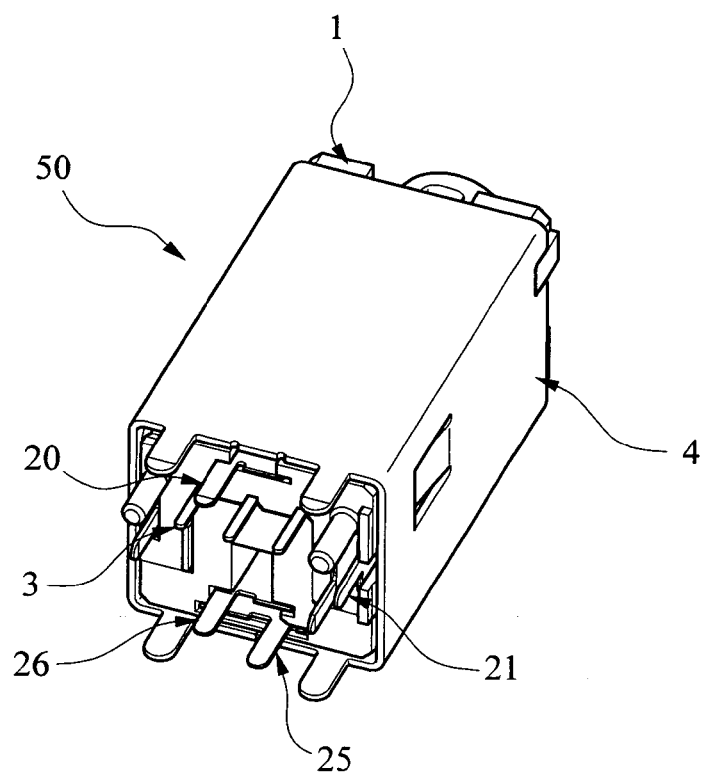
FIG. 3 is an assembled perspective view of the preferred embodiment of the present invention.
Figure 4:
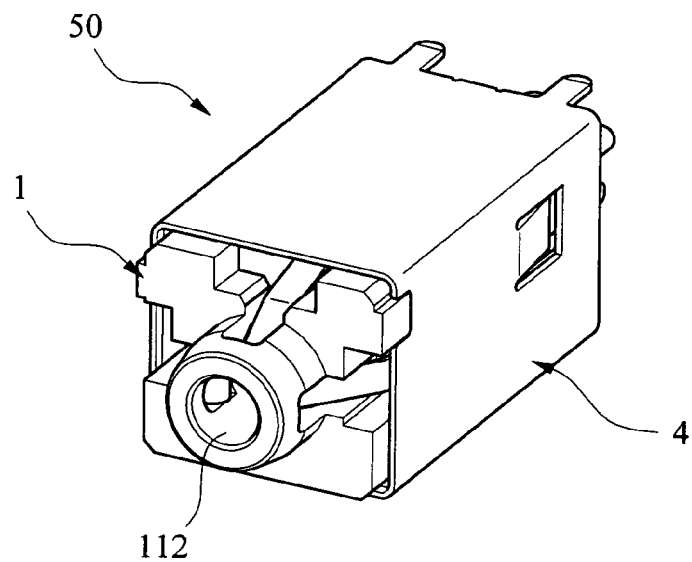
FIG. 4 is an assembled perspective view of the preferred embodiment of the present invention from another angle.
Figure 6:
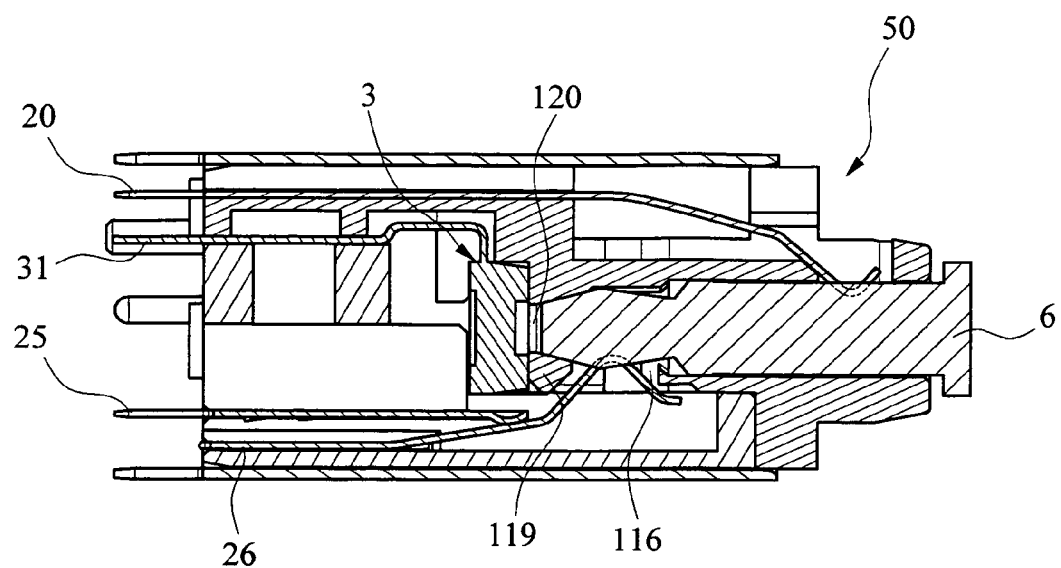
FIG. 6 is a section view when an optical fiber plug is inserted into the audio jack connector of the present invention.

The assembly of the audio jack connector 50 of the present invention is very simple. Firstly, fastening the plurality of terminals 20–26 respectively into the corresponding grooves 121–124 and slots 129–130. Next, disposing the LED 3 within the third chamber 118 of the insulative housing 1, the contact portion 30 of the LED 3 being clasped at the foremost of the third chamber 118, the conductive portion 31 of the LED 3 being exploded out of the third chamber 118 and to be soldered with the PCB. After that, making the lower cover body 12 and the upper seat body 11 to engage with each other firmly through the locating poles 126 and the locating holes 131, the convex rib 128 of the lower cover body 12 being clasped within the third chamber 118 and abutting against the conductive portion 31 of the LED 3 to make the LED 3 being more stable. Finally, sleeving the shielding case 4 onto the insulative housing 1 from the rear side, and achieving engagement through the latching structures thereof. After assembly, the whole audio jack connector 50 is shown in FIGS. 3 and 4, the assembled audio jack connector 50 being mounted onto the PCB 70 to achieve electrical connection is shown in FIG. 7. When the audio plug 5 is plugged into the audio jack connector 50, all terminals are contacted with the audio plug 5 except for the terminal 25, at this moment, the terminal 25 and the terminal 26 form a set of switch terminals, the terminal 25 and the terminal 26 are separated with each other to achieve signal transmission when the plug 5 and the terminal 26 are contacted, besides, the terminal 24 are not related to signal transmission, it is only used for increasing the axial insertion force on the plug 5 when the plug 5 is plugged in (as shown in FIG. 5). When the optical fiber plug 6 is plugged in, all the conductive terminals would loss their conducting effect, the optical fiber plug 6 contacts with the LED 3 by passing through the first chamber 116 and the opening 120 of the partition board 119, and to achieve high frequency signal transmission via the optical fiber (as shown in FIG. 6).

The embodiment disclosed in the present invention is illustrative only and not limitative to the scope of the present invention, any changes or modifications may be made by those skilled in the art via the description of the present invention without departing from spirits of the invention are considered as like structures of the invention and covered by the claims of the present invention.

What is claimed is:

1. A vertical type audio jack connector comprising an insulative housing (1), a plurality of terminals (20–26), an LED (Light Emitting Diode) (3) and a shielding case (4), wherein said insulative housing (1) comprises an upper seat body (11) and lower cover body (12), the upper seat body (11) has a rectangular portion (110) and a circular mating portion (120) extending from a side of the rectangular portion (110), the mating portion (120) has an insertion hole (112) passing through to an interior channel of the rectangular portion (110), on a left, right and top of the mating portions each having a notch (113–115) communicating with the insertion hole (112), on a rear of the upper seat body (11) and the lower cover body (12) having a plurality of grooves (121–125) and slide slots (129–130) for disposing said terminals (20–26), and in an interior of said insulative housing (1) having a first, a second and a third chamber (116–118), the third chamber (118) being provided for disposing said LED (3), wherein a plurality of grooves (121–125) disposed on a left, right and top of the upper seat body (11) are connected with the corresponding notches (113–115) of the mating portion (120), so as to enable said terminals (20–26) to be contacted with a mating plug (5 or 6);

wherein the first chamber (116) and the second chamber (117) are communicated with an interior channel of the rectangular portion (110), the first chamber (116) and the third chamber (118) are separated by a partition board (119) which has a tapered opening (120) for the LED (3) to operate a light transmission, and a rear of the third chamber (118) is an open space;

wherein said lower cover portion (12) has a base portion (127) and a convex rib portion (128), the convex rib portion (128) is clasped within the third chamber (118) and abutting against said LED (3) to hold the LED (3) in place, wherein said mating plug is selectively inserted into said insertion hole (112), said mating plug is selected from a group of plugs consisting of an audio plug (5) and an optical fiber plug (6);

wherein said LED (3) is provided for contacting with the optical fiber plug (6) to achieve high frequency signal transmission; first, second, third, fourth, and fifth ter minal of said plurality of terminals (20–24) are provided for contacting with the audio plug (5) in said audio jack connector to achieve signal connection, whereby said audio jack connector provides electrical connections for two different types of plug connectors, wherein a sixth terminal (25) and a seventh terminal (26) of the plurality of terminals form a set of switch terminals.

\* \* \* \* \*